US006374372B1

(12) United States Patent
Ha (10) Patent No.: US 6,374,372 B1
(45) Date of Patent: Apr. 16, 2002

(54) METHOD OF CHECKING PARALLEL PORT OF PERSONAL COMPUTER USING LOOPBACK (75) Inventor: Jung-chul Ha, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/134,149

(22) Filed: Aug. 14, 1998

(30) Foreign Application Priority Data

Sep. 4, 1997 (KR) ............................................ 97-45817

(51) Int. Cl.⁷ ............................................. G06F 11/273
(52) U.S. Cl. ............................... 714/43; 714/44; 703/25
(58) Field of Search ............................... 714/43, 44, 56, 714/57, 716, 30, 733; 703/21, 24, 25; 716/4; 710/15, 17; 379/5

(56) References Cited

U.S. PATENT DOCUMENTS

| 5,161,162 A | 11/1992 | Watkins et al. ............. 371/29.5 |
| 5,193,093 A | 3/1993 | Okazaki ....................... 371/34 |
| 5,247,690 A | 9/1993 | Fain ........................... 395/800 |
| 5,265,089 A | 11/1993 | Yonehara ...................... 370/15 |
| 5,357,519 A | 10/1994 | Martin et al. ............... 371/15.1 |
| 5,539,917 A | 7/1996 | Jirgal .......................... 395/842 |
| 5,557,741 A | 9/1996 | Jones ...................... 395/183.19 |
| 5,586,123 A | 12/1996 | Baker ......................... 371/20.5 |
| 5,588,114 A | 12/1996 | Bhatia .................... 395/183.01 |
| 5,592,615 A | 1/1997 | Mishima .................. 395/183.2 |
| 5,636,348 A | 6/1997 | Buxton et al. ............... 395/285 |
| 5,694,557 A | 12/1997 | Yang .......................... 395/309 |
| 5,754,881 A | 5/1998 | Aas ............................ 395/822 |

OTHER PUBLICATIONS

IBM Tech. Disc. Bull., "Printer Port Check Point Card", vol. No. 34, issue No. 7A, pp. 285–286, Dec. 1991.*

* cited by examiner

Primary Examiner—Scott Baderman
(74) Attorney, Agent, or Firm—Robert E. Bushnell, Esq.

(57) ABSTRACT

A method of checking a parallel port of a personal computer using loopback includes the steps of loopback-connecting pins corresponding to control signals and data signals transmitted to a printer to pins corresponding to status signals transmitted to the computer, checking whether there is a parallel port, stopping the checking when there is no parallel port, generating the control signals and reading looped-back status signals after a predetermined time to check control pins, and generating the data signals and reading looped-back status signals after a predetermined time to check data pins. Accordingly, a parallel port of a personal computer is tested without being connected to a printer, thereby simplifying the a production process. Also, manual printing is not required, thereby reducing test time and production time.

14 Claims, 10 Drawing Sheets

METHOD OF CHECKING PARALLEL PORT OF PERSONAL COMPUTER USING LOOPBACK

CLAIM OF PRIORITY

This application makes reference to, incorporates the same herein, and claims all benefits accruing under 35 U.S.C. §119 from an application for METHOD OF CHECKING PARALLEL PORT OF PERSONAL COMPUTER USING LOOPBACK earlier filed in the Korean Industrial Property Office on Sep. 4, 1997 and there duly assigned Serial No. 45817/1997.

BACKGROUND OF THE INVENTION

1. Technical Field

The present invention relates to a method of checking a parallel port during production of a personal computer and more particularly, to a method of checking a parallel port using a loopback technique, and to a loopback connector used for the same.

2. Related Art

Typically, a personal computer includes one parallel port and two serial ports, these ports being arranged on a rear of the computer. When a printer is connected to the parallel port, the personal computer transmits control signals for controlling the printer and data signals representing information to be printed, and receives status signals from the printer, through the parallel port.

Once a personal computer is in the final stages of manufacture, it is necessary to test the parallel port of the personal computer. To do so, a printer is usually connected to the parallel port and a test signal is transmitted to the printer from the personal computer. The status of the printer is then checked to test the operation of the parallel port.

The above method of testing the parallel port of a computer is complicated and time consuming. In addition, it requires a relatively large test space.

Therefore, there is a need for the development of a method for simply and effectively checking the parallel port of a personal computer. There is also a need for the development of a loopback connector which can be used for checking the parallel port.

The following patents are considered to be representative of the prior art, and are burdened by the disadvantages set forth herein: U.S. Pat. No. 5,161,162 to Watkins et al., entitled Method And Apparatus For System Bus Testability Through Loopback, U.S. Pat. No. 5,193,093 to Okazaki, entitled Data Transfer Process With Loop Checking, U.S. Pat. No. 5,247,690 to Fain, entitled Method For Detecting Transmitting Control Code Using M Out Of N Detection Scheme For Initiating A Latching Loopback Test Procedure, U.S. Pat. No. 5,265,089 to Yonehara, entitled Loopback Test Circuit, U.S. Pat. No. 5,357,519 to Martin et al., entitled Diagnostic System, U.S. Pat. No. 5,539,917 to Jirgal, entitled Computer System Having Circuit Interfacing A DMA Controller Directly With A Parallel Port Having Specific Timing Control To Allow Printing Operation Without Microprocessor Intervention, U.S. Pat. No. 5,557,741 to Jones, entitled Test Apparatus And Method For A Computer Parallel Port, U.S. Pat. No. 5,586,123 to Baker, entitled Interface And Loopback Circuit For Character Based Computer Peripheral Devices, U.S. Pat. No. 5,588,114 to Bhatia, entitled Method And Apparatus For Passive Loopback Testing Of Software-Controllable Parallel Ports, U.S. Pat. No. 5,592,615 to Mishima, entitled Malfunctioning Parts Detecting Device And A Method Of Detecting Malfunctioning Parts, U.S. Pat. No. 5,636,348 to Buxton et al., entitled Control System For A Multiple Mode Standard Parallel Port For A Personal Computer, U.S. Pat. No. 5,694,557 to Yang, entitled Time Multiplexing Address And Data On An Existing PC Parallel Port, and U.S. Pat. No. 5,754,881 to Aas, entitled Method Of Controlling A PC Parallel Port Switch For Connecting Multiple Peripherals To The Same Parallel Port.

SUMMARY OF THE INVENTION

To solve the above problems, it is a first object of the present invention to provide a method of simply and effectively checking the parallel port of a personal computer.

It is a second object of the present invention to provide a loopback connector for checking the parallel port.

Accordingly, to achieve the first object of the present invention, a method of checking a parallel port of a personal computer includes the steps of: loopback-connecting pins, corresponding to control signals and data signals transmitted to a printer, to pins corresponding to status signals transmitted to the computer; checking whether there is a parallel port, and stopping the checking if there is no parallel port; generating the control signals and reading looped-back status signals after a predetermined time to check control pins; and generating the data signals and reading looped-back status signals after a predetermined time to check data pins.

To accomplish the second object of the present invention, a loopback connector includes: a port connection portion for plugging into a parallel port of a personal computer; a pin interconnection portion, including 25 pins and a cover, for protecting the port connection portion and the pin interconnection portion, wherein a first pin is connected to a thirteenth pin, a tenth pin is connected to a sixteenth pin, an eleventh pin is connected to a seventeenth pin, a twelfth pin is connected to a fourteenth pin, and second through ninth pins are all together connected to a fifteenth pin.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
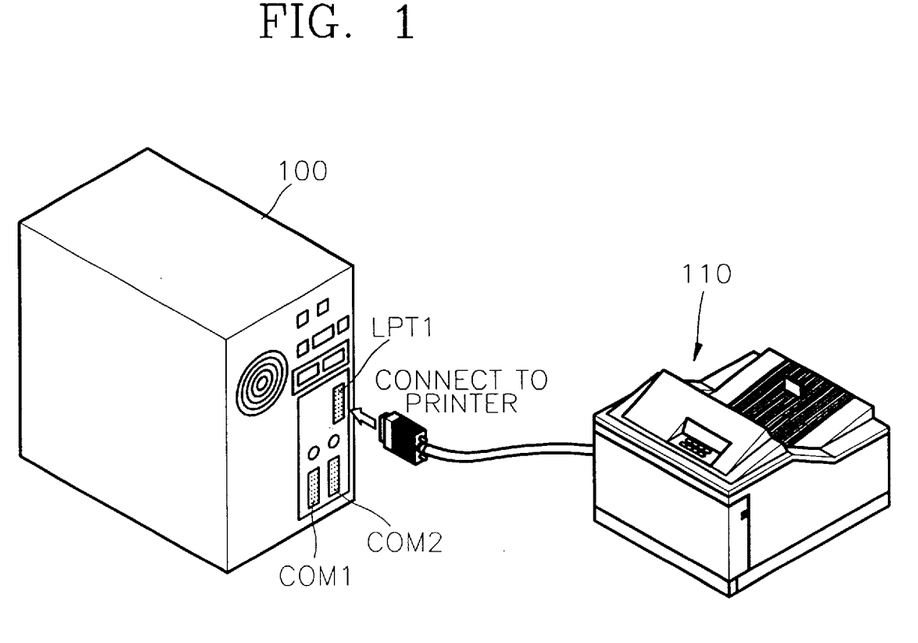
FIG. 1 illustrates an arrangement for checking a parallel port of a personal computer.

In FIG. 1, reference numeral 100 indicates a personal computer, viewed from behind, which includes one parallel port LPT1 and two serial ports COM1 and COM2. Reference numeral 110 indicates a printer connected to the personal computer.

In general, the personal computer 100 transmits control signals for controlling the operation of the printer 110 and data signals to be printed, and receives status signals from the printer 110, through the parallel port LPT1. The control signals are composed of a Strobe control signal indicating that valid data is included on data lines, an A/F control signal for automatically performing a linefeed after one line is printed by the printer 110, an Init control signal for beginning the operation of the printer 110, and a Slct in control signal for selecting a printer 110. The data signals correspond to bits of data output to the printer 110. The status signals include an Error status signal indicating whether the printer 110 generates an error, a Slct status signal for indicating selection of the printer 110, a P/E status signal for indicating whether the printer 110 has paper, an Ack status signal indicating whether the printer 110 receives data or not, and a Busy status signal indicating that the printer 110 cannot receive data. Each of the signals corresponds to an external pin of the parallel port LPT1. The parallel port LPT1 of the personal computer 100 has typically 25 pins.

In general, after completing manufacture of a personal computer 100, the parallel port LPT1 of the personal computer 100 is tested. Here, as shown in FIG. 1, a printer 110 is directly connected to the parallel port LPT1 of the personal computer 100 and a test signal of the personal computer 100 is transmitted to the printer 110. Then, the status of the printer 110 is checked to test the parallel port LPT1.

However, the above method of testing the parallel port is complicated and time consuming, and needs a relatively large test space.

Figure 2A:
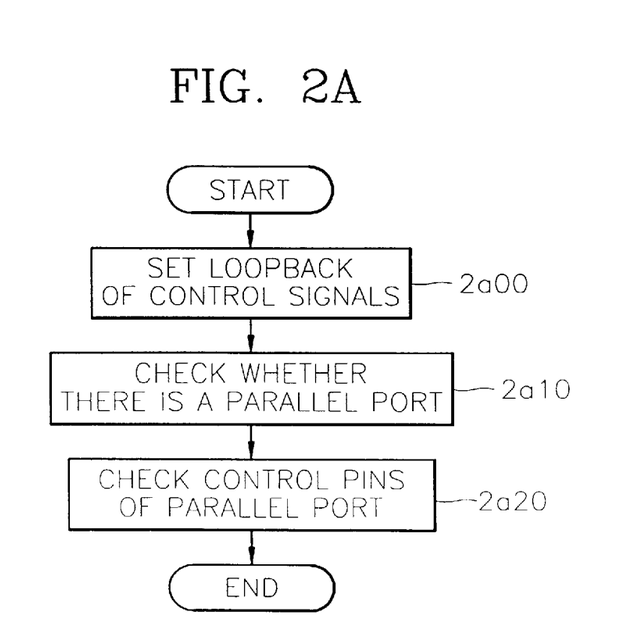
FIG. 2A is a flowchart of a process of checking a control pin of a parallel port according to the present invention.

Referring to FIG. 2A, a process of checking a control pin of a parallel port according to the present invention includes the steps of setting a control signal loopback (2a00), checking whether there is a parallel port (2a10), and checking control pins of the parallel port (2a20).

In the step 2a00 of setting a control signal loopback, pins corresponding to control signals are looped back to pins corresponding to status signals. This means that the strobe control signal, data signal, A/F control signal, Init control signal and Slct in control signal are, preferably, connected to the Select status signal, Error status signal, P/E status signal, Ack status signal and Busy status signal, respectively.

Figure 3A:
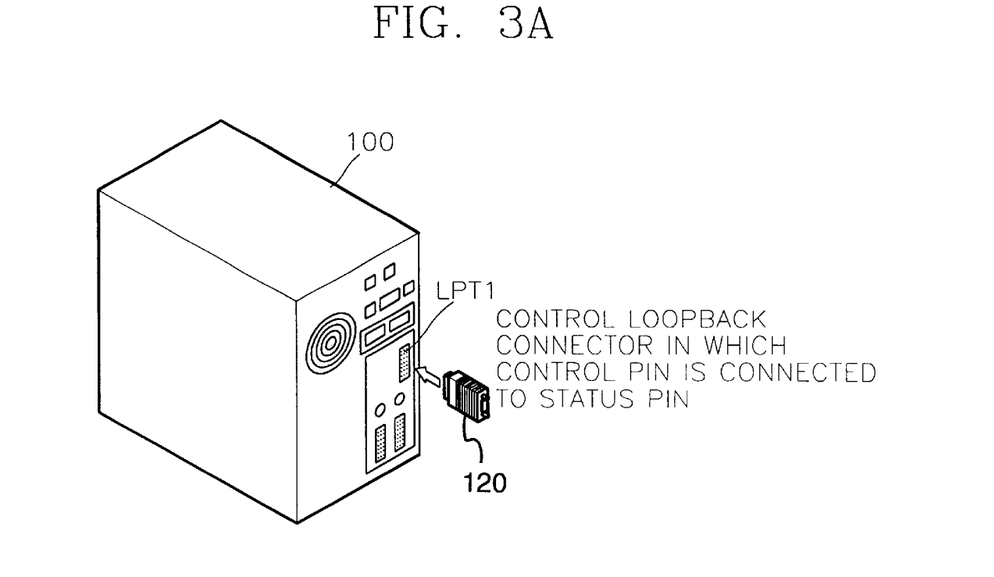
FIG. 3A illustrates a control loopback connector according to the present invention.
Figure 3B:
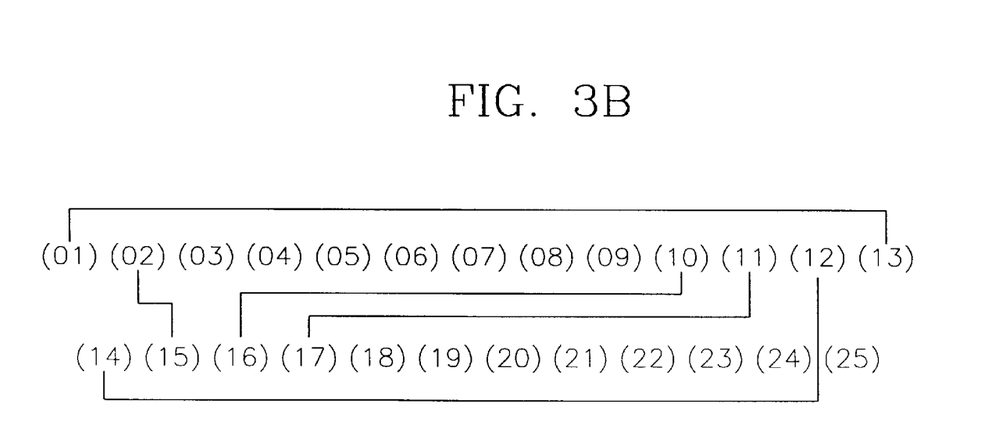
FIG. 3B shows connection of the control loopback connector according to the present invention.

A loopback connector as shown in FIG. 3A is used to make the loopback connections. The loopback connector 120 of FIG. 3A includes a port connection portion for plugging into a parallel port LPT1 of personal computer 100, a pin interconnection portion having 25 pins interconnected, and a cover for protecting the port connection portion and the pin interconnection portion. In the pin interconnection portion, as shown in FIG. 3B, a first pin is connected to a thirteenth pin, one pin selected from the group consisting of second to ninth pins is connected to a fifteenth pin, a tenth pin is connected to a sixteenth pin, an eleventh pin is connected to a seventeenth pin, and a twelfth pin is connected to a fourteenth pin. The loopback connector of FIG. 3B is called a control loopback connector.

Figure 3C:
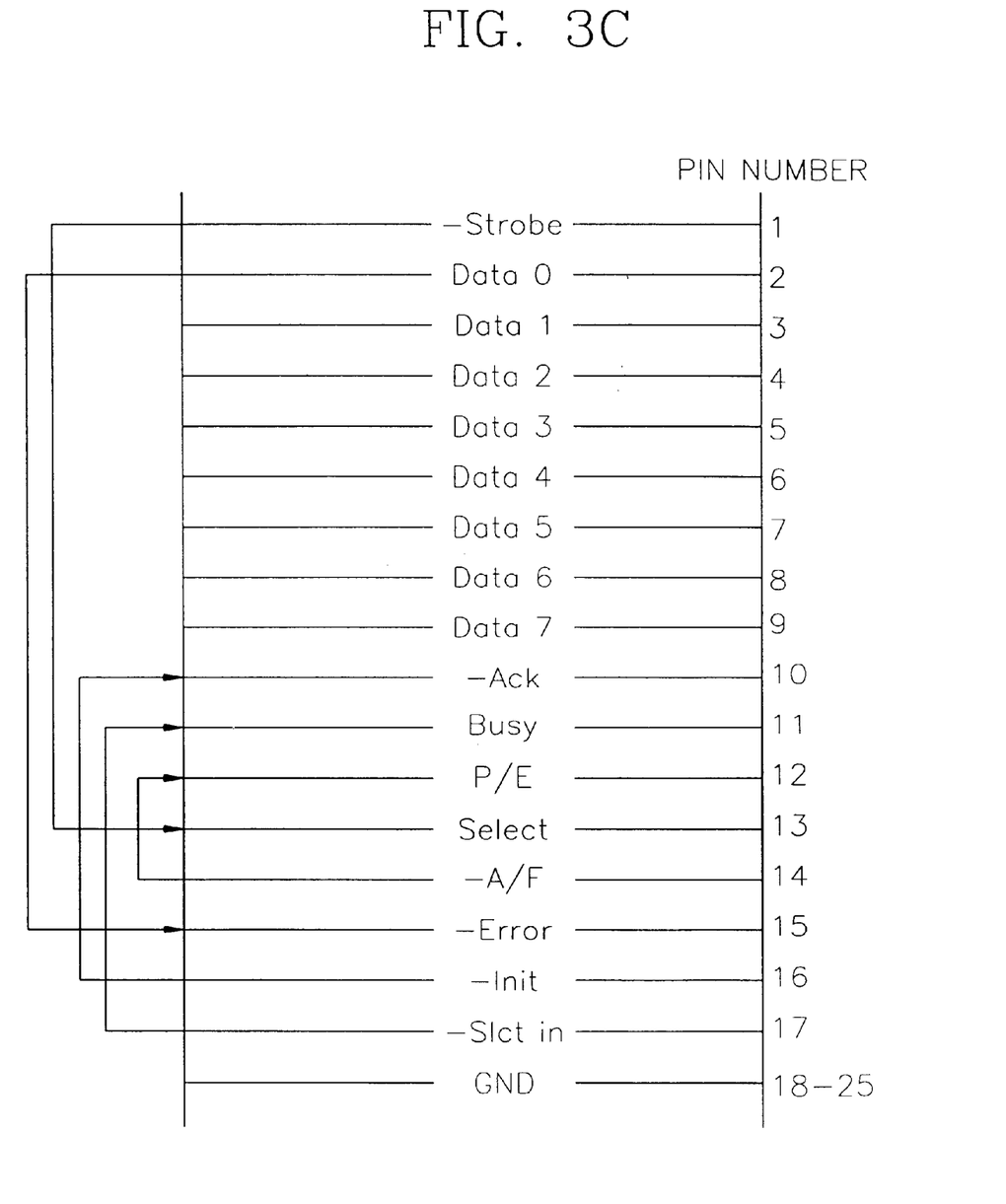
FIG. 3C shows the structure of the control loopback connector according to the present invention.

Referring to FIG. 3C, the control loopback connector is represented by a right portion indicating 25 pin numbers of the parallel port, a center portion indicating control signals, status signals and data signals corresponding to the pins of the parallel port, and a left portion indicating the interconnection of the various pins. Here, negative (−) signals are active at '0' and inactive at '1'.

Accordingly, in step 2a00 (FIG. 2A) of setting control signal loopback, control loopback connector 120 (FIG. 3A) is connected to the parallel port LPT1. Then, step 2a10 of checking whether there is the parallel port and step 2a20 of checking a control pin of the parallel port are realized by a parallel port control pin checking program as shown in FIG. 2B.

Figure 2B:
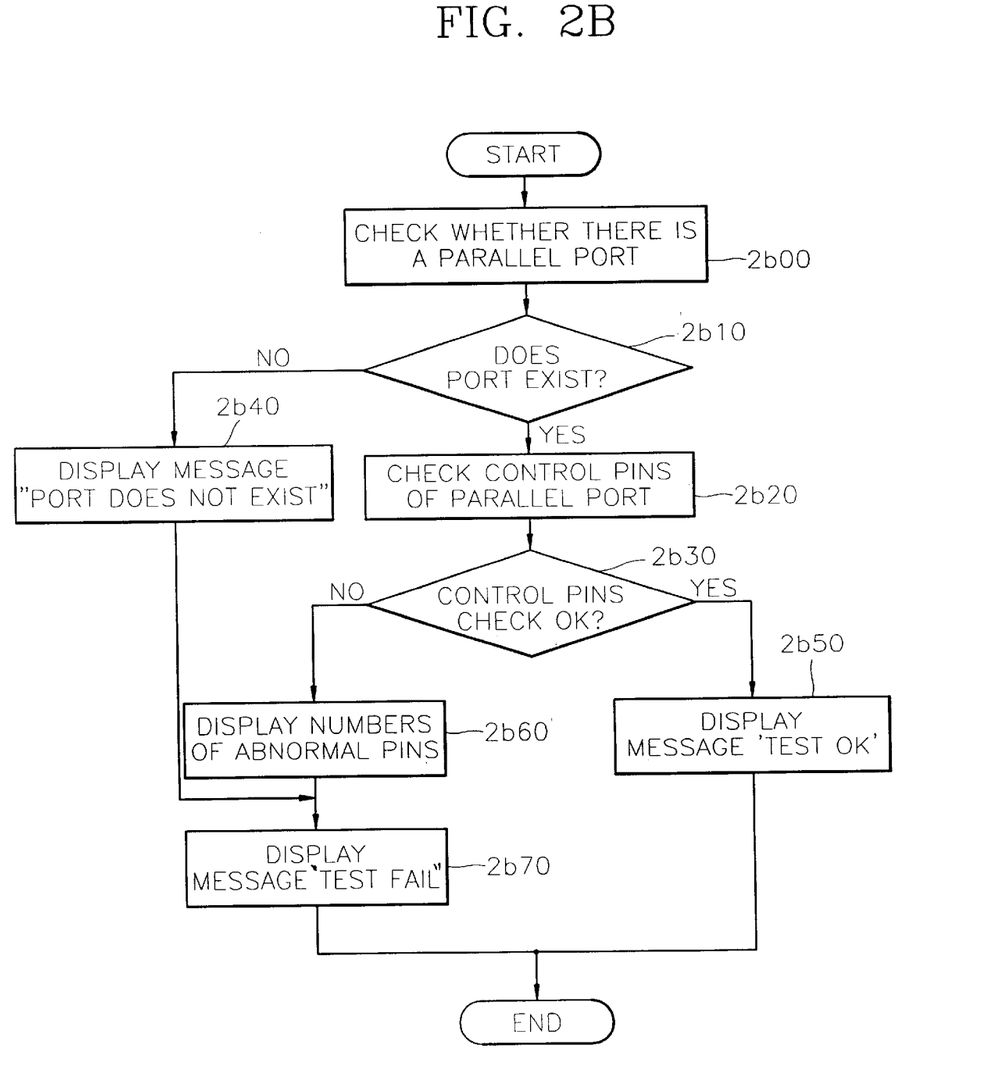
FIG. 2B is a flowchart showing in detail the steps 2*a*10 and 2*a*20 of FIG. 2A as realized by software.

Referring to FIG. 2B, the parallel port control pin checking program checks whether there is parallel port (step 2b00).

The personal computer checks various materials of the system during execution of an initial program, and the check result is stored in a memory, so that the stored value can be checked to determine whether there is a parallel port. Also, predetermined data is written in a parallel port, the data stored at the parallel port is read, and the written data is compared to the read data, to thereby check whether there is a parallel port. The control pins of the parallel port are checked when the parallel port is present (steps 2b10 and 2b20).

Figure 2C:
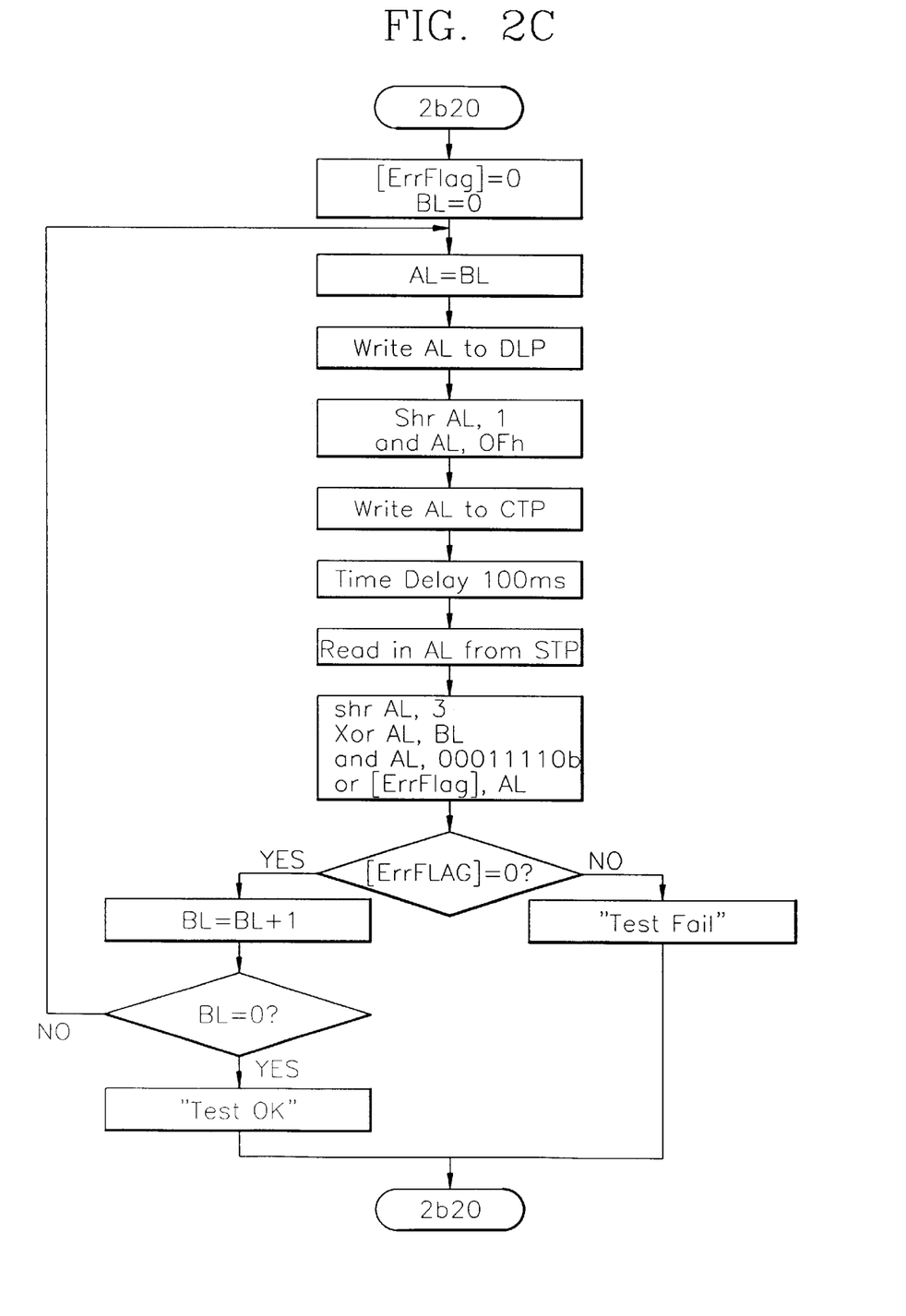
FIG. 2C is a flowchart showing in detail step 2*b*20 of FIG. 2B.

In FIG. 2C, reference characters AL and BL each represent an 8-bit register of a personal computer, a parallel data latch port (DLP) represents a register for temporarily storing data to be transmitted to a printer through the parallel port, a parallel control port (CTP) represents a register for temporarily storing control signals to be transmitted to the printer through the parallel port, and a parallel status port (STP) represents a register for temporarily storing status signals transmitted by the printer. Accordingly, predetermined control signals are transferred to the parallel port through the DLP and CTP, and the same signals are looped back after a predetermined time, so that the parallel port can be tested by checking the values stored in the STP.

When the control pins of the parallel port are normal, a message "Test OK" is displayed (FIG. 2B steps 2b30 and 2b50) and when one or more control pins are abnormal, the numbers of the abnormal pins and a message "Test Fail" are displayed (steps 2b30, 2b60 and 2b70).

When it is determined (at step 2b10) that there is no parallel port, messages "Port does not exist" and "Test Fail" are displayed (steps 2b10, 2b40 and 2b70).

Figure 4A:
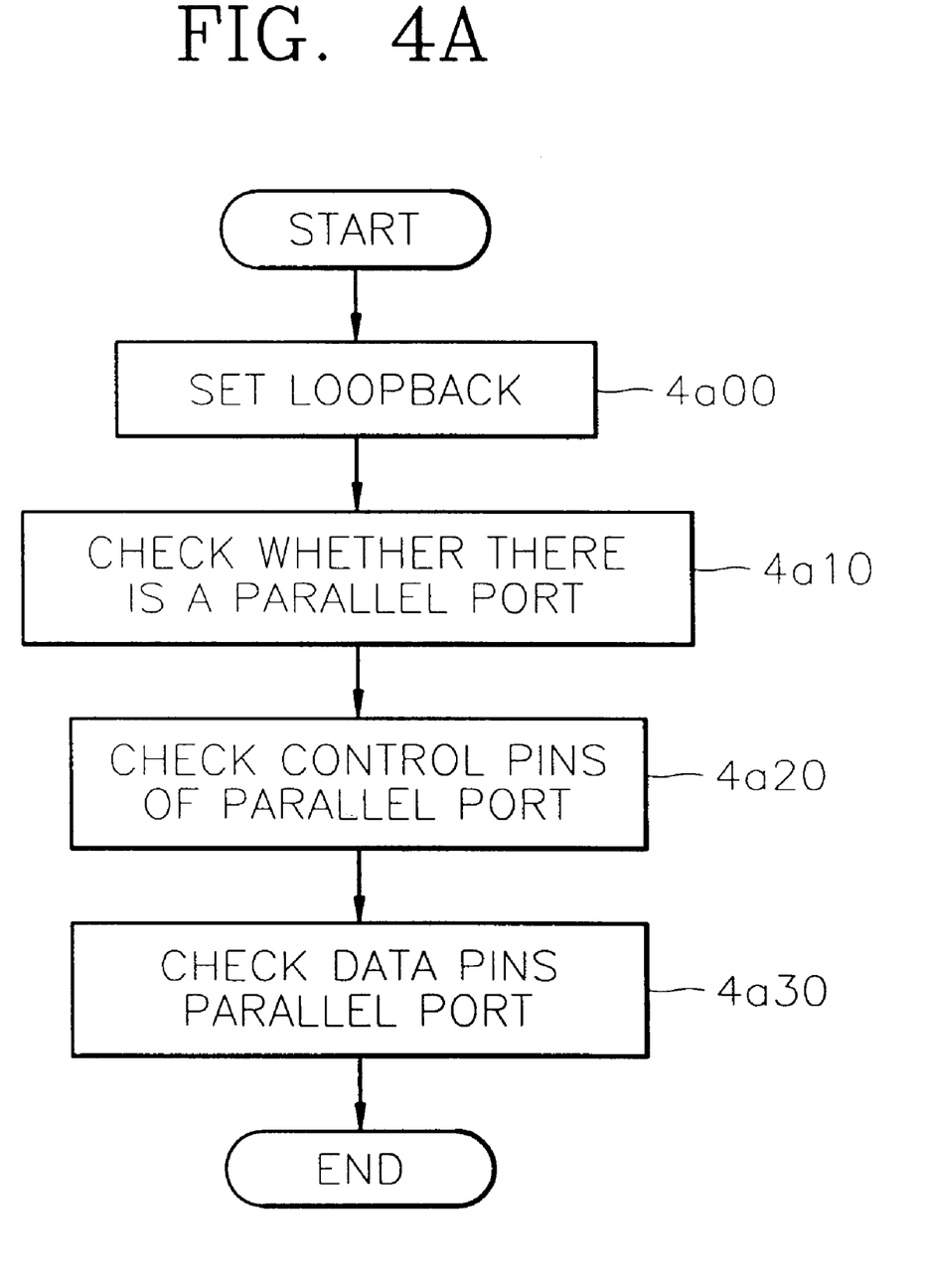
FIG. 4A is a flowchart of a process of checking a parallel port according to the present invention.

Referring to FIG. 4A, the parallel port is checked by the steps of setting loopback (4a00), checking whether there is a parallel port (4a10), checking control pins of the parallel port (4a20) and checking data pins of the parallel port (4a30).

In the step 4a00 of setting loopback, pins corresponding to control signals and data signals are looped back to pins corresponding to status signals. This means that the strobe control signal, 8-bit data signals, A/F control signal, Init control signal and Slct in control signal are, preferably, connected to the Select status signal, Error status signal, P/E status signal, Ack status signal and Busy status signal, respectively.

Figure 5A:
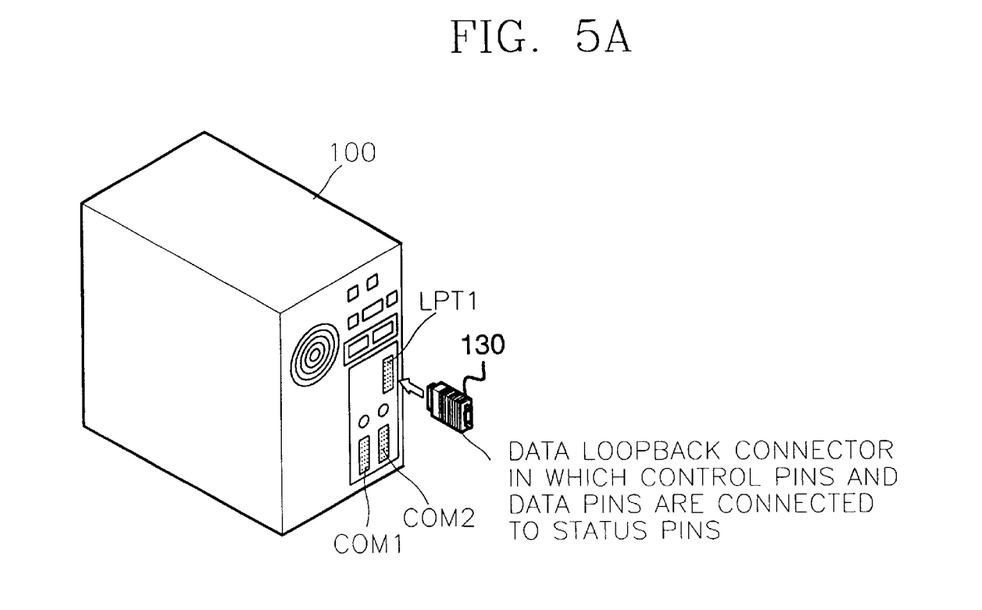
FIG. 5A illustrates a data loopback connector for checking control pins and data pins of a parallel port according to the present invention.
Figure 5B:
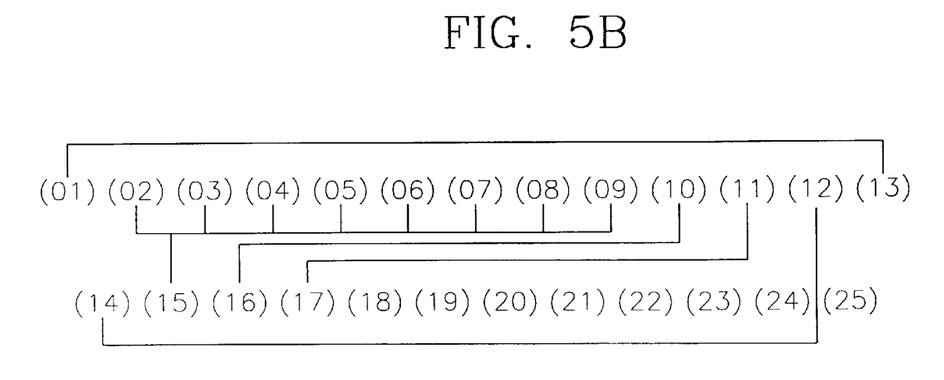
FIG. 5B shows connection of the data loopback connector according to the present invention.

A loopback connector as shown in FIG. 5A is used to make loopback connections. The loopback connector 130 includes a port connection portion for plugging into the parallel port of a personal computer, a pin interconnection portion having 25 pins interconnected, and a cover for is protecting the port connector and the pin interconnection portion. In the pin interconnection portion, as shown in FIG. 5B, a first pin is connected to a thirteenth pin, a tenth pin to a sixteenth pin, an eleventh pin to a seventeenth pin, a twelfth pin to a fourteenth pin, and each of the second through is ninth pins connected to a fifteenth pin. The loop connector of FIG. 5B is called a data loopback connector.

Figure 5C:
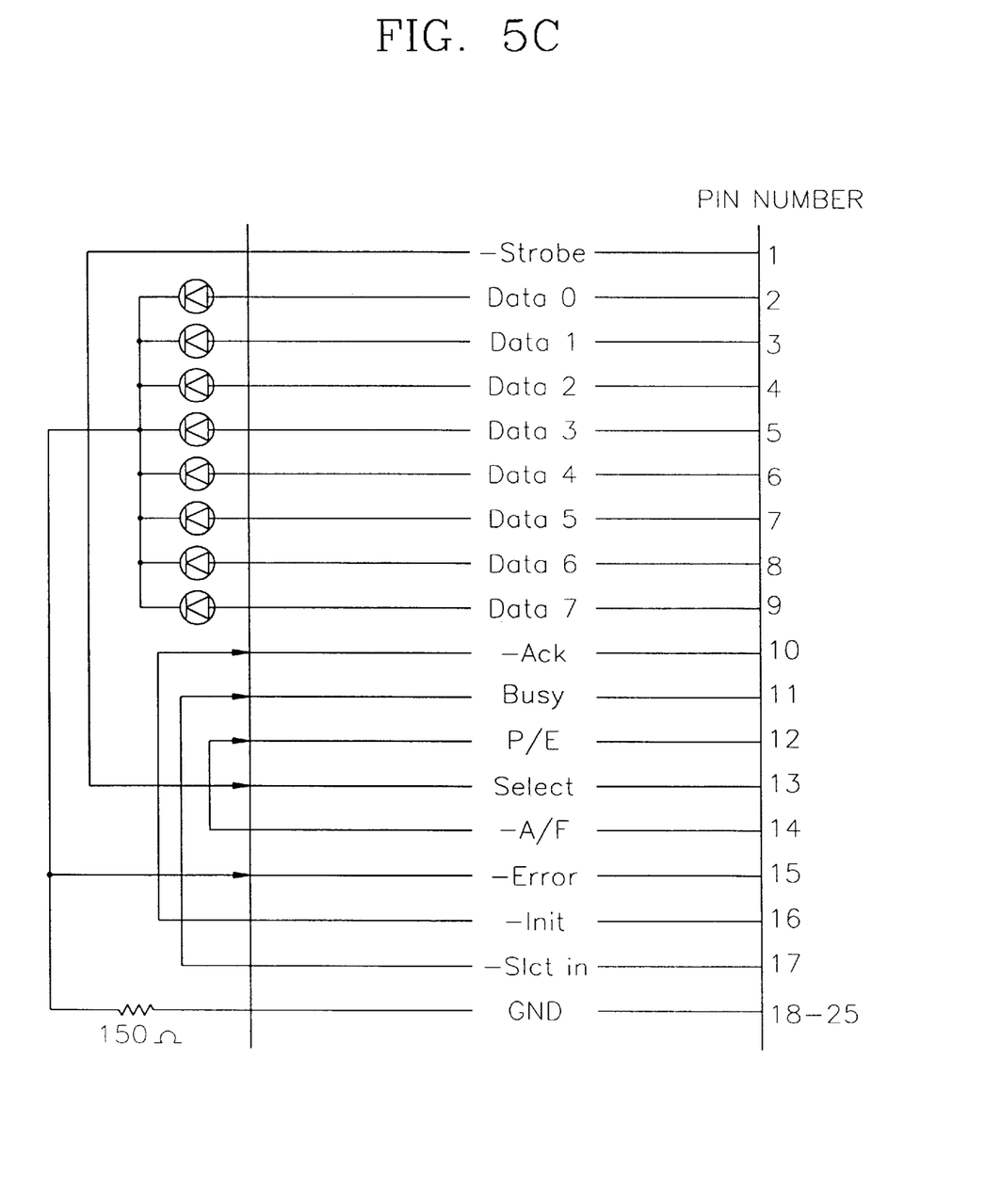
FIG. 5C shows the structure of the data loopback connector according to the present invention.

Referring to FIG. 5C, the data loopback connector is represented by a right portion indicating 25 pin numbers of the parallel port, a center portion indicating control signals, status signals and data signals corresponding to each pin, and a left portion indicating the pins that are connected together.

Accordingly, in step 4a00 of setting the loopback, as in step 2a00 of setting control loopback, the data loopback connector 130 (FIG. 5A) is connected to the parallel port LPT1.

Figure 4B:
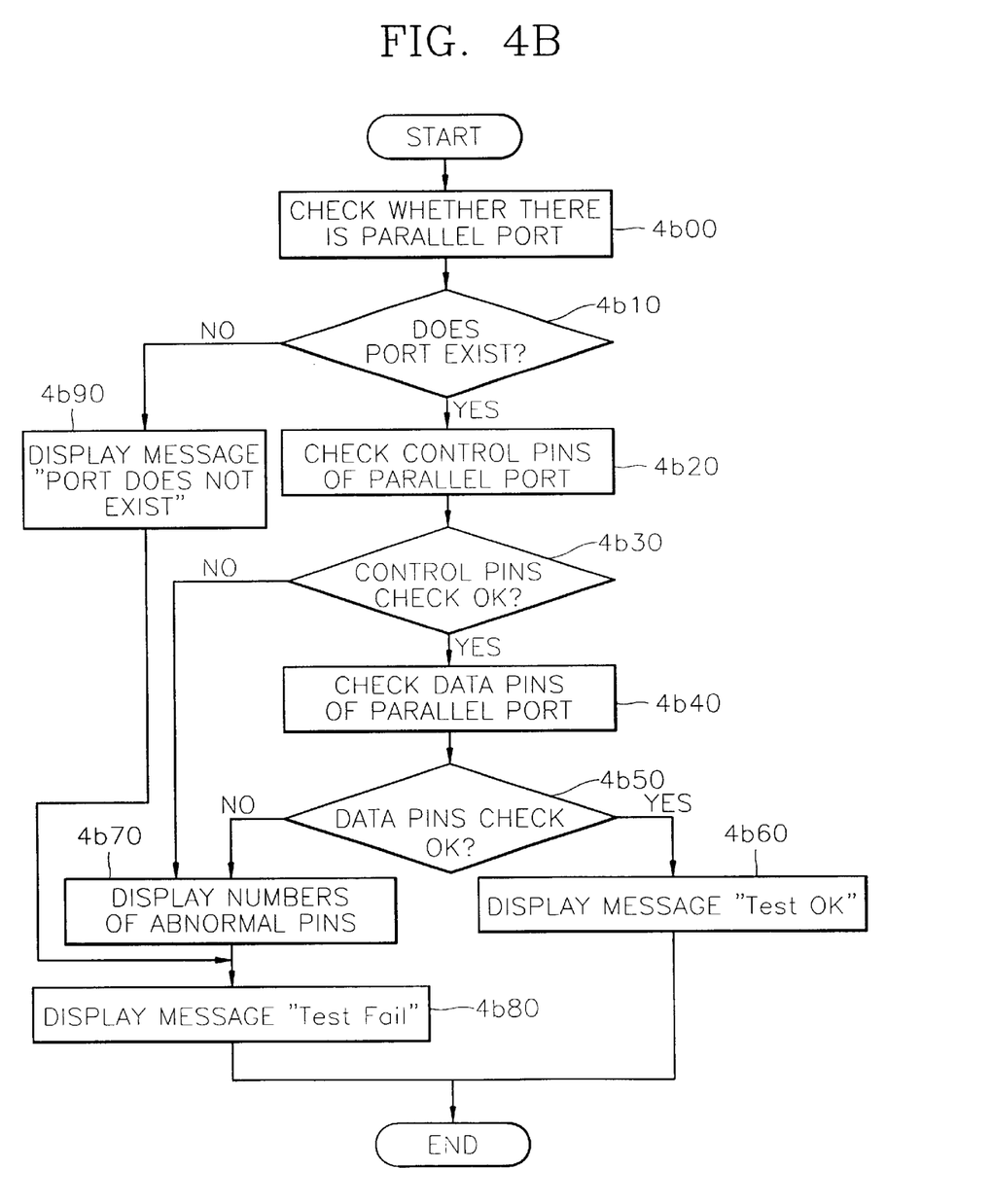
FIG. 4B is a detailed flowchart of steps 4*a*10, 4*a*20 and 4*a*30 of FIG. 4A as realized by software.

Then, the steps of checking whether there is a parallel port (4a10), checking control pins of the parallel port (4a20) and checking data pins of the parallel port (4a30) are realized by the parallel port checking program of FIG. 4B.

The parallel port checking program checks whether there is a parallel port (step 4b00)in the same manner as in step 2b00, and checks the control pin of the parallel port when there is a parallel port (steps 4b10 and 4b20) in a manner similar to that of step 2b20.

When step 4b20 of checking the control pins of the parallel port is normal, the data pins of the parallel port are checked (steps 4b30 and 4b40).

Figure 4C:
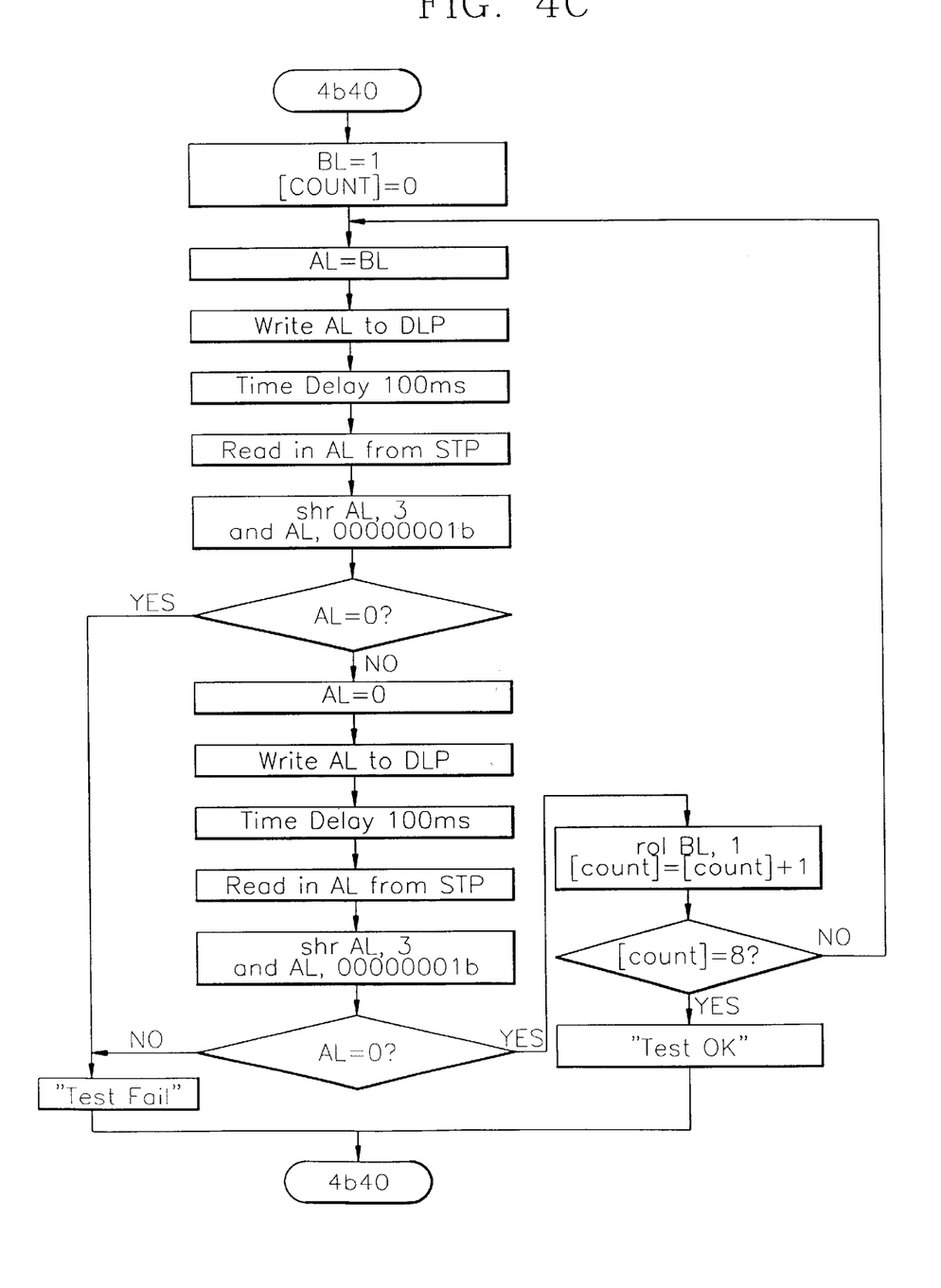
FIG. 4C is a flowchart showing in detail step 4b40 of FIG. 4B.

Referring to FIG. 4C, step 4b40 of checking the data pins of the parallel port is performed by the steps of setting the first bit of the data register, checking the fourth bit of the status register, resetting the first bit of the data register, checking the fourth bit of the status register, and repeating the above steps for second to eighth bits of the data register. In FIG. 4C, reference characters A1, BL, DLP, CTP and STP indicate elements identical to those of FIG. 2C.

When the control pins and the data pins of the parallel port are normal, a message "Test OK" is displayed (steps 4b50 and 4b60), and when one or more control pins or data pins are abnormal, the numbers of the abnormal pins and a message "Test Fail" are displayed (steps 4b30, 4b50, 4b70 and 4b80).

When there is no parallel port (step 4b10), messages "Port does not exist" and "Test Fail" are displayed (steps 4b80 and 4b90).

According to the present invention, a parallel port of a personal computer may be tested without being connected to a printer, thereby simplifying a production line. Also, manual printing is not required, thereby reducing test time and production time.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of checking a control pin of a parallel port of a personal computer, comprising the steps of:
   (a) loopback-connecting pins, corresponding to control signals transmitted to a printer, to pins corresponding to status signals transmitted to the computer;
   (b) checking whether there is a parallel port, and stopping the checking when there is no parallel port; and
   (c) generating the control signals and reading looped-back status signals after a predetermined time to check said control pin.

2. The method of claim 1, wherein, in step (a), pins corresponding to a Strobe control signal, a data signal, an A/F control signal, an Init control signal, and an Slct in control signal are connected to pins corresponding to a Select status signal, an Error status signal, a P/E status signal, an Ack status signal, and a Busy status signal.

3. The method of claim 1, wherein step (b) comprises the steps of:
   determining whether the parallel port exists;
   when the parallel port exists, checking control pins of the parallel port; and
   when the parallel port does not exist, displaying an error message.

4. The method of claim 3, wherein step (c) comprises the steps of:
   determining whether the control pins are operating properly;
   when the control pins are operating properly, displaying a message indicating proper operation; and
   when the control pins are not operating properly, displaying a number of abnormally operating pins.

5. A method of checking a parallel port of a personal computer, comprising the steps of:
   (a) loopback-connecting pins, corresponding to control signals and data signals transmitted to a printer, to pins corresponding to status signals transmitted to the computer;
   (b) checking whether there is a parallel port, and stopping the checking when there is no parallel port;
   (c) generating the control signals and reading looped-back status signals after a predetermined time to check control pins of the parallel port; and
   (d) generating the data signals and reading looped-back status signals after a predetermined time to check data pins of the parallel port.

6. The method of claim 6, wherein, in step (a), pins corresponding to a Strobe control signal, an A/F control signal, an Init control signal, and an Slct in control signal are connected to pins corresponding to a Select status signal, a P/E status signal, an Ack status signal, and a Busy status signal, and wherein all pins of an 8-bit data signal are connected to a pin corresponding to an Error status signal.

7. The method of claim 6, wherein said step (d) comprises the steps of:
   (d1) setting a first bit of a data register for temporarily storing data to be transmitted through the parallel port;
   (d2) checking a fourth bit of a status register for temporarily storing status signals received from the printer;
   (d3) resetting the first bit of the data register;
   (d4) checking the fourth bit of the status register; and
   (d5) repeating the steps (d1) thru (d4) for second through eighth bits of the data register.

8. The method of claim 5, wherein step (b) comprises the steps of:

determining whether the parallel port exists:

when the parallel port does not exist, displaying an error message, and when the parallel port exists, checking control pins of the parallel port.

9. The method of claim 5, wherein step (b) comprises the steps of:

determining whether the control pins are operating correctly;

when the control pins are not operating correctly, displaying a number of abnormally operating pins; and when the control pins are operating correctly, checking the data pins of the parallel port.

10. The method of claim 5, wherein step (d) comprises the steps of:

determining whether the data pins of the parallel port are operating correctly;

when the data pins are not operating correctly, displaying a number of abnormally operating pins; and when the data pins are operating correctly, displaying a message indicating normal operation of the data pins.

11. A method of checking a control pin of a parallel port of a personal computer, comprising the steps of:

(a) loopback-connecting pins, corresponding to control signals transmitted to a printers to pins corresponding to status signals transmitted to the computer;

(b) checking whether there is a parallel port, and stopping the checking when there is no parallel port; and (c) reading looped-back status signals after a predetermined time to check said control pin.

12. The method of claim 11, wherein, in step (a), pins corresponding to a Strobe control signal, a data signal, an A/F control signal, an Init control signal, and an Slct in control signal are connected to pins corresponding to a Select status signal, an Error status signal, a P/E status signal, an Ack status signal, and a Busy status signal.

13. The method of claim 11, wherein step (b) comprises the steps of:

determining whether the parallel port exists:

when the parallel port exists, checking control pins of the parallel port; and when the parallel port does not exist, displaying an error message.

14. The method of claim 13, wherein step (c) comprises the steps of:

determining whether the control pins are operating properly;

when the control pins are operating properly, displaying a message indicating proper operation; and when the control pins are not operating properly, displaying a number of abnormally operating pins.

* * * * *